US009336390B2

(12) United States Patent
Pavlyushchik

(10) Patent No.: US 9,336,390 B2
(45) Date of Patent: May 10, 2016

(54) SELECTIVE ASSESSMENT OF MALICIOUSNESS OF SOFTWARE CODE EXECUTED IN THE ADDRESS SPACE OF A TRUSTED PROCESS

(71) Applicant: Kaspersky Lab ZAO, Moscow (RU)

(72) Inventor: Mikhail A. Pavlyushchik, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 214 days.

(21) Appl. No.: 13/938,966

(22) Filed: Jul. 10, 2013

(65) Prior Publication Data
US 2014/0325650 A1    Oct. 30, 2014

(30) Foreign Application Priority Data
Apr. 26, 2013    (RU) .................... 2013119285

(51) Int. Cl.
*G06F 21/00* (2013.01)
*H04L 29/06* (2006.01)
*G06F 21/56* (2013.01)

(52) U.S. Cl.
CPC .......... *G06F 21/566* (2013.01); *H04L 63/1416* (2013.01); *H04L 63/1441* (2013.01)

(58) Field of Classification Search
None
See application file for complete search history.

(56) References Cited

U.S. PATENT DOCUMENTS

| 7,228,563 | B2 |   | 6/2007  | Szor |
| 7,284,276 | B2 | * | 10/2007 | Conover et al. ................ 726/26 |
| 7,287,283 | B1 |   | 10/2007 | Szor |
| 7,472,420 | B1 | * | 12/2008 | Pavlyushchik .................. 726/24 |
| 7,484,239 | B1 |   | 1/2009  | Tester et al. |
| 7,530,103 | B2 |   | 5/2009  | Willman et al. |
| 7,607,041 | B2 |   | 10/2009 | Kraemer et al. |
| 7,607,174 | B1 | * | 10/2009 | Kashchenko et al. .......... 726/25 |
| 7,752,459 | B2 |   | 7/2010  | Cowan et al. |
| 7,797,702 | B1 |   | 9/2010  | Ferrie |
| 7,870,612 | B2 | * | 1/2011  | Liu ....................... G06F 21/562 713/188 |
| 8,042,186 | B1 |   | 10/2011 | Polyakov et al. |
| 8,104,089 | B1 |   | 1/2012  | Guo et al. |
| 8,176,556 | B1 | * | 5/2012  | Farrokh ............. H04L 63/1483 713/188 |
| 8,230,499 | B1 | * | 7/2012  | Pereira ........................... 726/22 |
| 2006/0242712 | A1 | * | 10/2006 | Linn et al. ...................... 726/26 |
| 2007/0079371 | A1 | * | 4/2007  | Laird-McConnell ... G06F 21/53 726/22 |
| 2008/0016339 | A1 | * | 1/2008  | Shukla .................... G06F 21/53 713/164 |
| 2008/0120611 | A1 | * | 5/2008  | Aaron .......................... 717/174 |
| 2008/0229415 | A1 | * | 9/2008  | Kapoor .................. G06F 21/55 726/22 |

(Continued)

OTHER PUBLICATIONS

Chien et al.' "Blended Attacks Exploits, Vulnerabilities and Buffer-Overflow Techniques in Computer Viruses", Symantec Security Response, Virus Bulletin, 2002, 36 pages.*

(Continued)

*Primary Examiner* — Abu Sholeman
*Assistant Examiner* — Maung Lwin
(74) *Attorney, Agent, or Firm* — Patterson Thuente Pedersen, P.A.

(57) ABSTRACT

System and method for detection of malicious code injected into processes associated with known programs. Execution of processes in a computer system is monitored. From among the processes being monitored, only certain processes are selected for tracking. For each of the processes selected, function calls made by threads of the process are tracked. From among the tracked function calls, only those function calls which are critical function calls are identified. For each identified critical function call, program instructions that caused the critical function call are subjected to analysis to assess their maliciousness.

30 Claims, 7 Drawing Sheets

(56) References Cited

U.S. PATENT DOCUMENTS

| | | |
|---|---|---|
| 2008/0271142 A1 | 10/2008 | Murawski et al. |
| 2009/0089878 A1* | 4/2009 | Monastyrsky et al. ......... 726/22 |
| 2009/0187963 A1* | 7/2009 | Bori ........................ G06F 21/51 |
| | | 726/1 |
| 2010/0125830 A1 | 5/2010 | Lamana |
| 2011/0041176 A1* | 2/2011 | Maria .................. H04Q 3/0025 |
| | | 726/13 |
| 2011/0082962 A1* | 4/2011 | Horovitz ............... G06F 11/301 |
| | | 711/6 |
| 2011/0214157 A1* | 9/2011 | Korsunsky .............. G06F 21/55 |
| | | 726/1 |
| 2011/0219449 A1* | 9/2011 | St. Neitzel .............. G06F 21/00 |
| | | 726/23 |
| 2011/0277033 A1 | 11/2011 | Ramchetty et al. |
| 2012/0060217 A1 | 3/2012 | Sallam |
| 2012/0210423 A1* | 8/2012 | Friedrichs ........... H04L 63/1416 |
| | | 726/22 |
| 2012/0222116 A1 | 8/2012 | Chenette |
| 2012/0284808 A1 | 11/2012 | Teglia |
| 2014/0096184 A1* | 4/2014 | Zaitsev ................... G06F 21/56 |
| | | 726/1 |
| 2014/0165130 A1* | 6/2014 | Zaitsev ................... G06F 21/00 |
| | | 726/1 |
| 2014/0208413 A1* | 7/2014 | Grobman ............ H04L 63/0227 |
| | | 726/14 |
| 2014/0298462 A1* | 10/2014 | Stuntebeck ........... G06F 21/554 |
| | | 726/23 |

OTHER PUBLICATIONS

Shinagawa et al., "A Hierarchical Protection Model for Protecting Against Executable Content", Tokyo. 9 pages, created Mar. 22, 2003.

Kiriansky et al., "Secure Execution Via Program Shepherding", 11$^{th}$ Annual USENIX Security Symposium, 19 pages. Apr. 11, 2013. http://static.usenix.org/events/sec02/full_papers/kiriansky/kiriansky_html.

* cited by examiner

SELECTIVE ASSESSMENT OF MALICIOUSNESS OF SOFTWARE CODE EXECUTED IN THE ADDRESS SPACE OF A TRUSTED PROCESS

PRIOR APPLICATIONS

This application claims priority to Russian Federation Patent Application No. 2013119285, filed Apr. 26, 2013, and incorporated by reference herein.

FIELD OF THE INVENTION

The invention relates generally to information processing and communications technologies and, more particularly, to computer security apparatus and methods for assessing whether a piece of code (i.e. program instructions), configured to be executed in the address space of a trusted process, contains malicious code.

BACKGROUND OF THE INVENTION

With the expansion of the application fields for computer devices, the number of various malicious programs is also growing, such as network worms, trojan programs and computer viruses. Generally, the purpose of malicious programs is to gain control over a computer system, in order to perform such actions as, for example, theft of confidential information.

One of the approaches used to detect malicious programs involves analyzing the behavior of applications. This approach is based on the interception of functions called by an application and on their subsequent study. The study discovers various suspicious actions, such as an attempt to access system files by a non-trusted process (for example, a process launched from a file which appeared in the system relatively recently).

Conventional approaches of this type for detecting malicious programs tend to have one substantial deficiency. This deficiency is due to the fact that the malicious code, using, for example, program or operating system vulnerabilities, can be implemented in the address space of a trusted process in order to create threads or in order to be launched among the existing process's threads, which will be executed on behalf and at the privilege level of that process. In this case, the attempt to access the system files, initiated by the malicious code and discussed above as an example, will not be considered suspicious because it will be executed on behalf of a trusted process. The malicious programs that use the above-described infection pattern are known in the field as exploits.

An example of a trusted process, on behalf of which a malicious code can be executed, is svchost.exe—a process in the Microsoft Windows® operating system family, for services loaded from dynamic libraries. In an operating system, several copies of this process can be launched for each of the services registered in a special partition of the system registry. If a malicious program succeeds in registering as such a service, then the malicious program code will be executed in the address space of one of the svchost.exe processes.

A browser process can be considered as another example of a trusted process traditionally exploited by malicious programs. A malicious code located on a page visited by the user can be automatically downloaded and launched in the address space of the browser process if vulnerabilities exist.

A number of solutions intended to detect a malicious code that uses the above-discussed infection pattern have been proposed.

For example, in one approach, as disclosed in U.S. Pat. No. 7,228,563 when a critical function (for example, a new process creation function) is called, the address of the code which calls for that function in the memory is determined. If the calling code is not located in the memory area where executable code storage is allowed, the call for the function is deemed suspicious and is forcefully terminated. The non-executable memory area can be, in particular, an area of the dynamically allocated memory (a heap) in the virtual address space of a process. This area is used to place data objects dynamically created by a process in the memory allocated for the process. Since the above-mentioned area contains data, the presence of an executable code in this area is non-typical and is deemed suspicious.

Another approach, as disclosed in U.S. Pat. No. 8,230,499, is intended to detect a malicious code executed in the address space of a browser process. At the interception of a download function (for example, UrlDownloadToFileA, UrlDownloadToFileW, UrlDownloadToCacheFileA, and UrlDownloadToCacheFileW), the return address of the called function is determined; if the return address is located in a heap, the download is prohibited.

It should be noted that, when the above-mentioned approaches are used, the malicious code will not be detected if it is located in the executable area of an address space. Also, verification of the calls for critical functions for all processes without exceptions is a resource-consuming task and can result in "freezing" of the applications being run by the user.

A need therefore exists for a solution that overcomes deficiencies such as those discussed above, while providing effective and efficient detection of malicious code.

SUMMARY OF THE INVENTION

One aspect of the invention is directed to a system for detection of malicious code injected into processes associated with known programs. The system includes a computing device comprising a plurality of computing resources including computing hardware and an operating system executing on the computing hardware, and a plurality of programs interfaced with the computing resources and executable as processes having one or more threads. A set of instructions are executable by the computing hardware and stored in a non-transitory storage medium. When executed, they cause the computing hardware to implement a set of modules. Among the modules is a process monitor module that detects active processes being executed on the computing hardware. A process selection module selects, from among the processes being monitored by the process monitor module, only those processes which are susceptible processes, the process selection module selecting the susceptible processes based on predefined process selection criteria. A function call tracking module tracks function calls made by threads of each of the susceptible processes selected by the process selection module. A critical function call interception module that identifies, from among the tracked function calls, only those function calls which are critical function calls. The critical function call interception module identifies the critical function calls based on critical function determination criteria. An analysis module identifies, for each identified critical function call, program instructions that caused that critical function call, and assess maliciousness of the program instructions based on a set of analysis criteria.

In another aspect of the invention, a method is provided for detection of malicious code injected into processes associated with known programs. The method includes:

monitoring execution of processes on the computing hardware;

selecting, from among the processes being monitored, only those processes which are susceptible processes, wherein the selecting is based on predefined process selection criteria;

for each of the susceptible processes selected, tracking function calls made by threads of the process;

identifying, from among the tracked function calls, only those function calls which are critical function calls, wherein the identifying of the critical function calls is based on critical function determination criteria;

for each identified critical function call, identifying program instructions that caused the critical function call; and assessing maliciousness of the program instructions based on predefined assessment criteria.

BRIEF DESCRIPTION OF THE DRAWINGS

The invention may be more completely understood in consideration of the following detailed description of various embodiments of the invention in connection with the accompanying drawings, in which.

Figure 1A:
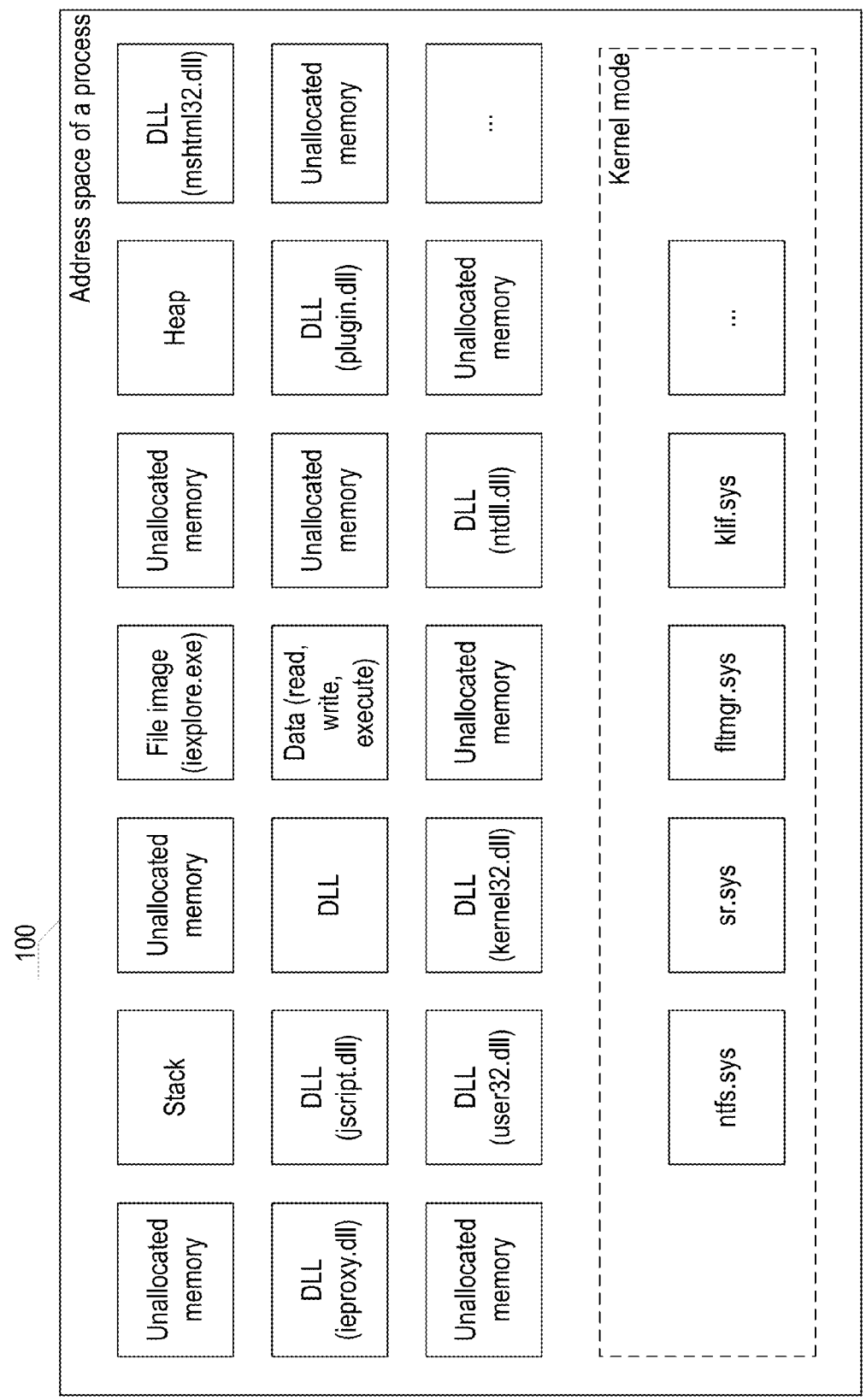
FIG. 1A is a block diagram illustrating a typical example of a virtual address space of a process.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

A process may be considered as a container of resources which are required to execute program's code. A process has a virtual address space, a sample structural diagram of which is illustrated in FIG. 1. Into the virtual address space of a process 100, an executable file is projected, from which the process is loaded (in the example being discussed, it is the file iexplore.exe of the Internet Explorer web browser), as well as the dynamic-link libraries (DLLs) related to it. Also, the address space of the process stores data structures, such as a stack and a heap, which will be discussed below in more detail. Each process contains at least one thread. A thread uses system resources (for example, files, system registry keys, synchronization objects) and the address space of the process. The execution of a program code occurs via the process threads.

Figure 1B:
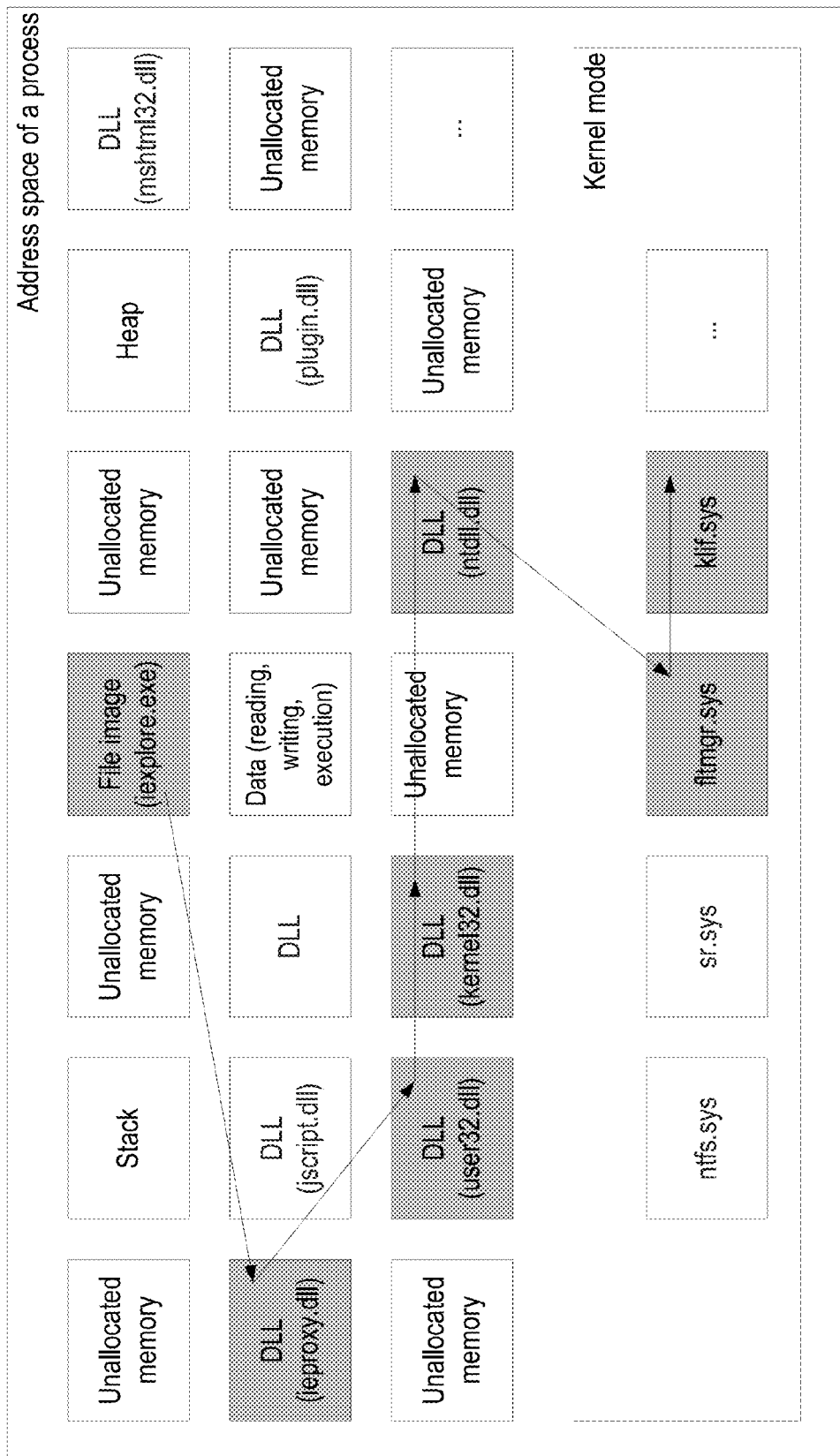
FIG. 1B is a block diagram illustrating a typical example of a sequence of calls performed on behalf of a process not infected by an exploit.
Figure 1C:
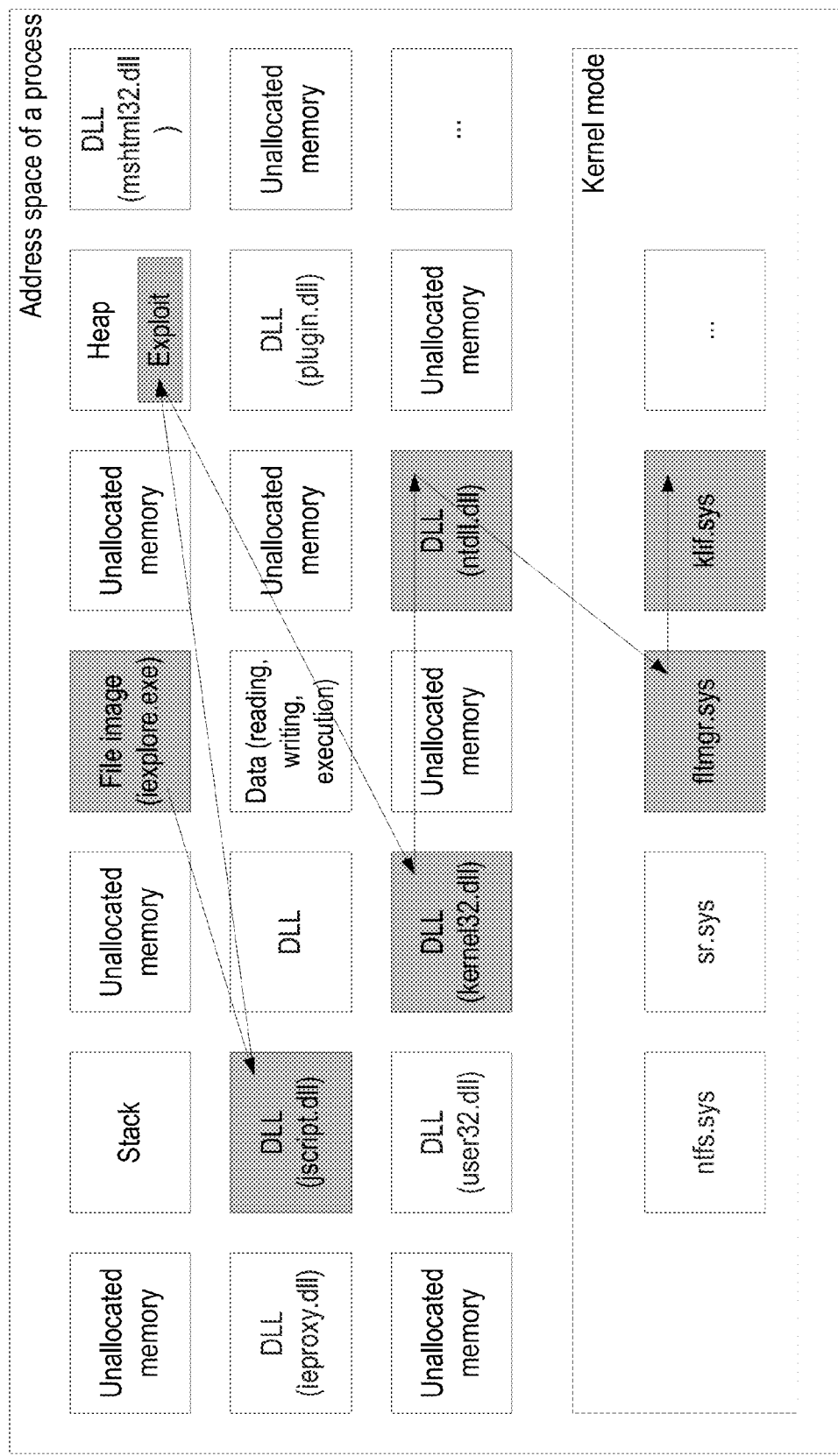
FIG. 1C is a block diagram illustrating a typical example of calls performed on behalf of a process infected by an exploit.

The examples illustrated in FIGS. 1B and 1C illustrate the difference between a sequence of the calls made on behalf of a process not containing an exploit and the sequence of the calls made on behalf of the same process containing an exploit. As can be seen from the example shown in FIG. 1C, at a certain stage, control is transferred to an executable code located in a heap. All subsequent calls will be made by the exploit on behalf of the exemplary process, iexplore.exe, in order to implement the malicious functionality. According to the approaches according to certain aspects of the invention, the transfer of control to an executable code located in a heap represents a criterion indicative of maliciousness of the code. Therefore, the use of approaches described herein will facilitate the timely detection of a malicious piece of code and prevent the realization of its malicious functionality.

Figure 2:
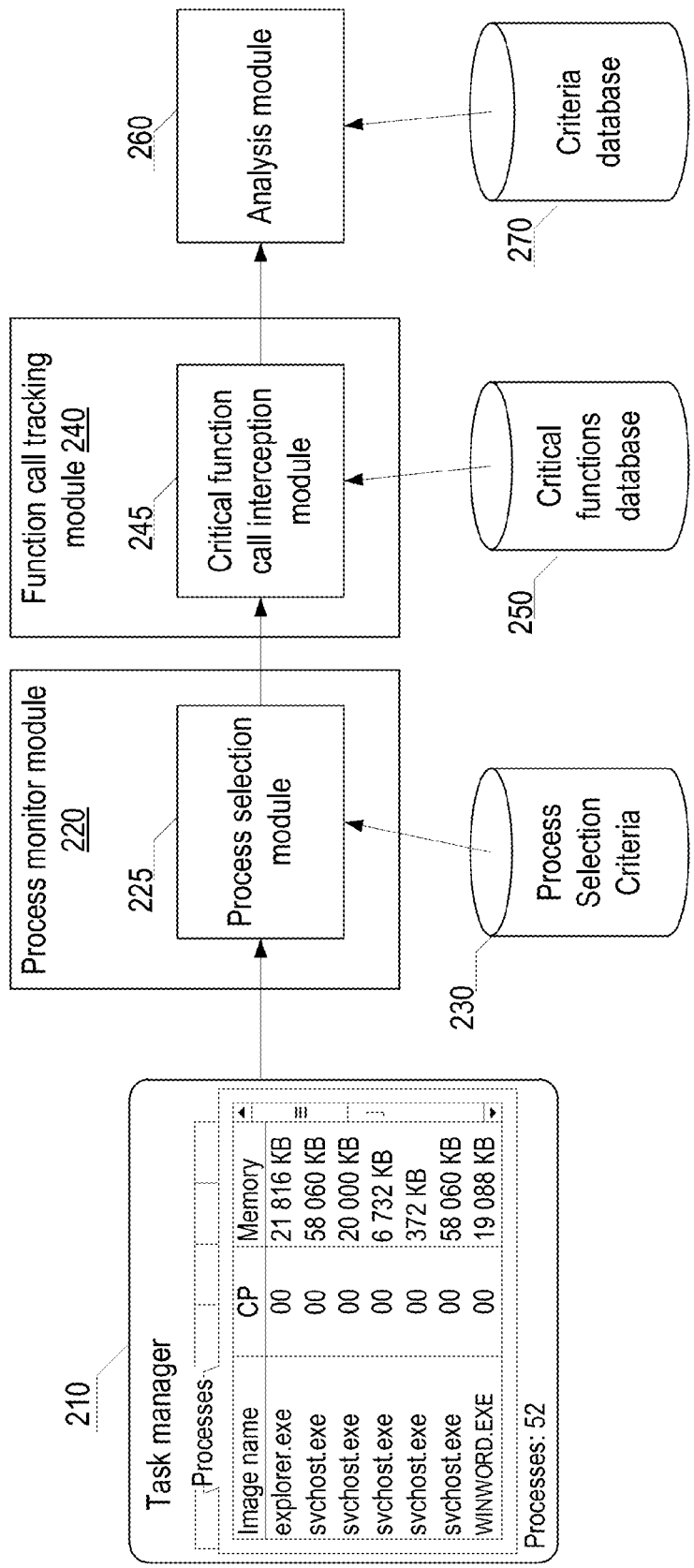
FIG. 2 is a structural diagram illustrating a computer-implemented system for assessing the maliciousness of a piece of code executed in the address space of a trusted process according to one embodiment of the present invention.

FIG. 2 is a structural diagram illustrating a system architecture for assessing the maliciousness of a piece of code executed in the address space of a trusted process. A list of processes 210 executed at an arbitrary moment in an operating system includes, typically, several dozen (or possibly more) processes, depending on the number of launched applications. It should be noted that FIG. 2 shows a simplified example of a list of processes being executed. The same principles will apply to a larger and more diverse set of processes.

Analyzing each and every process for the presence of malicious code is a resource-consuming task, the execution of which can result in perceived slow operation of the computer system or the non-responsiveness, i.e., "freezing" of applications at various stages of their operation. In order to solve the above-mentioned problem, one aspect of the present invention involves selectively targeting the analysis at processes which are determined to be susceptible processes, i.e., those processes for which the presence of a malicious code in the address space is deemed most likely.

Accordingly, an arrangement of modules, which will be described in greater detail below, are provided. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers (e.g., cluster nodes) that execute an operating system, system programs, and application programs, including cluster computing operations, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

Processes being executed on the computing hardware are monitored by process monitor module 220. In one approach, process monitor module 220 detects the launching of a process and creates a pointer to the address space of that process, or provides some other suitable indication of every process being executed in the operating system. Process monitor module 220 includes process selection module 225, which classifies a process as either worth analyzing, or not worth analyzing, on the basis of certain characteristics. Those processes that are worth analyzing are generally processed which are more susceptible to the insertion of malware. In a related embodiment, the process selection criteria for detecting and selecting susceptible processes is stored in a process selection criteria database 230. Examples of such characteristics will be discussed below.

As it was noted above, the infiltration of a malicious code in the address space of a process can be performed by exploiting a vulnerability in an application. This is why, in a specific embodiment of this invention, the fact that a process belongs to a known vulnerable application represents a characteristic of a susceptible process.

In another specific embodiment of the invention, a characteristic of a susceptible process can be represented by the fact that the process belongs to an application which establishes network connections (for example, a Web browser), because applications of this type are most often exploited by malicious programs.

In addition, the capability provided in an application for creation of child processes (for example, processes for downloading and installing updates, processes for new tabs in various browser versions) can be used by a malicious program to implement the malicious functionality. Therefore, another characteristic of a susceptible process can be represented by the fact that the process belongs to an application which has the capability to create child processes.

Other characteristics of a susceptible process can be: the fact that the process belongs to a popular application (usually, the more popular is the application, the more actively offenders look for its vulnerabilities in order to exploit it), and the fact that the process belongs to an application whose size exceeds a set value (usually, the larger is the application, the more vulnerabilities it has).

Another characteristic of a susceptible process can be the fact that the process belongs to an application which was launched without using a file manager. A file manager (for example, Windows Explorer) implements a graphical user interface for working with an operating system (launch of applications, work with files and the system registry, etc.). Therefore, the launch of an application without the use of a file manager means that the application was not launched on the user's initiative, which is a suspicious circumstance.

Having detected susceptible processes in the system, the process selection module 225 transmits the identifiers of those processes to the critical function call interception module 245. The critical function call interception module 245 is intended to intercept the calls for critical functions among the calls for all functions performed by each susceptible process, which are tracked by function call tracking module 240. In this embodiment, a critical function is a function associated with malicious code being executed in the address space of a susceptible process. In general, in order to implement its functionality, a piece of malicious code must create a new process or a new thread. Therefore, in one embodiment, the function of creating a new process (CreateProcess) and the functions of creating a new thread (CreateThread/CreateRemoteThread) will be deemed critical.

Other examples of critical functions can exist for certain types of susceptible processes. For example, if a process belonging to an application whose functionality does not involve creation of executable files (for example, Adobe Reader) performs an executable file writing function (e.g., WriteFile), such function will be critical as well.

The information on which functions called by a susceptible process should be deemed critical is received by the critical function call interception module 245 from the critical functions database 250.

If a critical function has been intercepted by the critical function call interception module 245 among the calls for all the functions performed by a susceptible process, the information about the call for such function, together with the identifier of the process which made the call, are transmitted to the analysis module 260. The analysis module 260 performs the analysis of the received call stack in order to identify the executable code that initiated the call for that function. The procedure for analyzing a call stack will be discussed below in more detail. Upon identification of the address of the executable code which initiated the call for the critical function, the analysis module 260 assesses the maliciousness of the code, based on a number of criteria, information about which is stored in the criteria database 270.

Depending on the embodiment of the invention, the criteria for assessing the maliciousness of a piece of code can include:
- the fact that the executable code is located in a heap;
- the fact that the code contains instructions typical for exploits (for example, instructions used by an exploit to determine its address. For x86 architecture processors, such instructions may take the following form, for instance: call $+5; pop <reg>);
- the fact that the code contains characteristics of a position-independent code. The presence of such characteristics is typical for exploits because a position-independent code can be implemented in any memory area of the exploited program. Work with the Structured Exception Handling (SEH) mechanism and analysis of the export of libraries can be examples of such characteristics;
- the fact that the code contains operation codes (opcodes) typical for data alignment;
- the fact that the code contains encoded hashes from function names.

In a specific embodiment for this invention, the assessment of the maliciousness of the code that initiated a call for the new process creation function (CreateProcess) is made based on the facts and circumstances surrounding the receipt of the file. The following are examples of the criteria for assessing the suspiciousness of the file being launched:
- the source from which the file is received. The fact that the file was received, for example, from a malicious website can mean that the code being executed is malicious. In this case, the database 270 can store a list of such sources;
- the fact that the user was involved in the download of the file. Offenders often use the so-called "drive-by download" technology, when the launch of a malicious object on a user computer follows its automatic download from a website visited by the user. In this case, the download and the launch of the malicious object do not require the user to take any actions or to confirm his/her consent. For this reason, a file downloaded without direct participation of the user will be deemed suspicious, just like the code loaded from such file;

the amount of time passed from the moment the file is assembled to the moment it appears on the user's computer. The specifics of the creation of exploits require that as little time as possible passes from the moment the offender discovers a vulnerability in software to the moment a malicious code exploiting that vulnerability is launched on the user's computer; (otherwise the software manufacturer can make a correction to the vulnerability, which will make a successful attack less likely). For this reason, in order to accelerate the attack, the malicious files that use vulnerabilities are usually not tested. Therefore, for the malicious files, the amount of time passed from the moment of assembly to the moment of appearance on the user's computer is substantially shorter than for the safe files.

The assessment of the maliciousness of a piece of code based on the above criteria can be made via the analysis module 260, using such devices as fuzzy logic or artificial neural networks. After the assessment, a decision is made on the maliciousness of the executable code. In a specific embodiment for this invention, after the assessment of the maliciousness, the information is transmitted to an antivirus system installed on the user's computer, for further verification.

Figure 3:
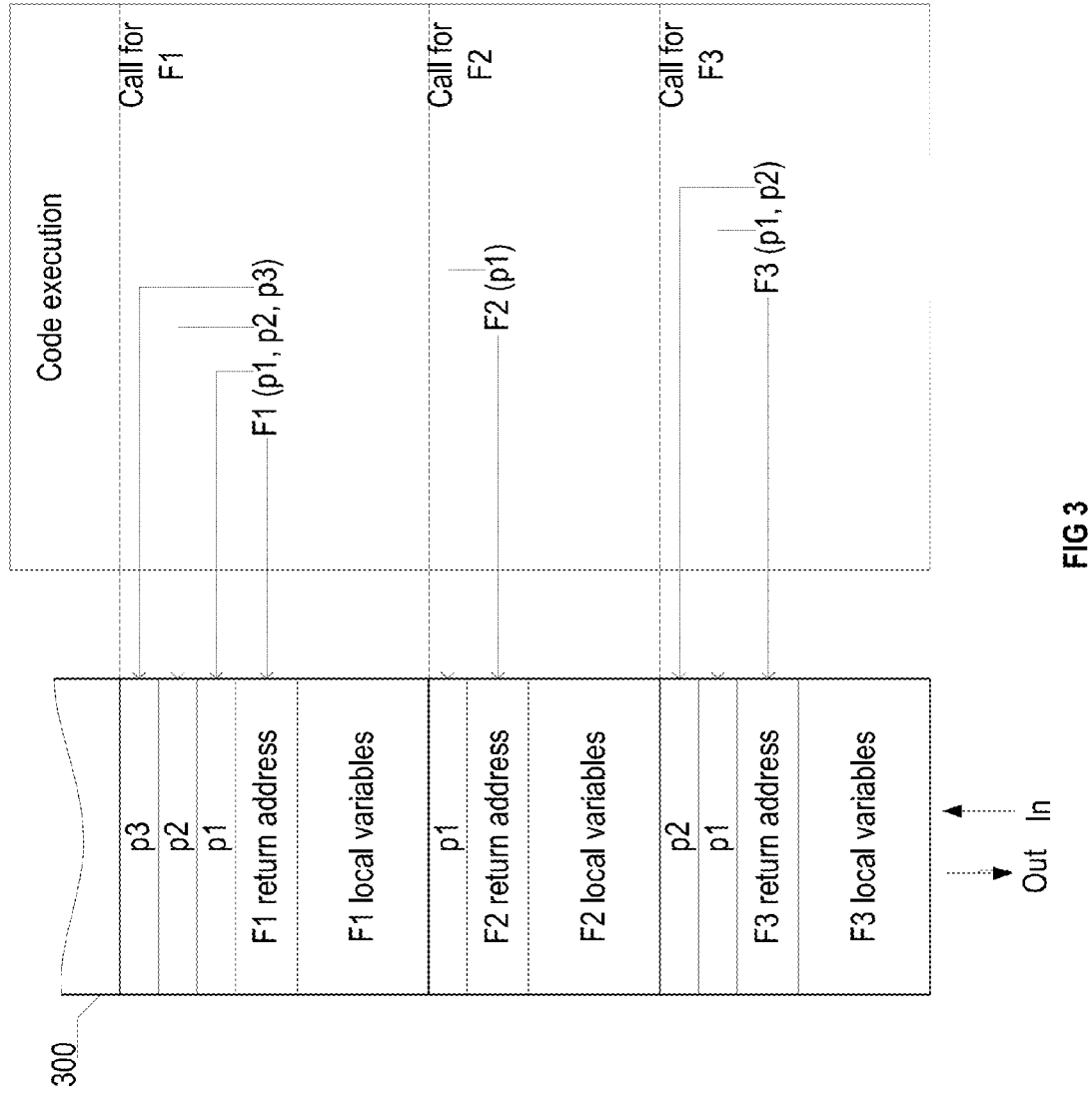
FIG. 3 is a block diagram illustrating an example of a call stack and associated code execution.

FIG. 3 is a diagram illustrating the use of a function call stack according to one embodiment. A function call stack is a data structure organized using the LIFO principle ("last in—first out"). A stack 300 stores information for returning control from subprograms to a program (or to a subprogram, in case of nested or recursive calls). The example presented in FIG. 3 shows that, during the execution of the code, a call occurs for the function F1, which has the parameters p1, p2 and p3. The actual call for the function is preceded by the transmission of its parameters to the stack, which may be performed in reverse order—from parameter p3 to parameter p1. Also, in response to calling of function F1, the address for return from this function is pushed to the stack; this is the memory address of the instruction immediately following the function call instruction. If required, a memory area for local variables of the F1 function is also allocated in the stack. Similar actions are performed at subsequent calls for function F2 with parameter p1 and for function F3 with parameters p1 and p2. The stack element that stores information on one copy of a function is referred to as a stack frame. As can be seen from the diagram, by analyzing function return addresses, beginning from the last stack frame, it is possible to find the address of the code which initiated the call for any of the functions.

If, for example, function F3 is found to be a critical function, the call for which was made on behalf of a susceptible process, the module 260, when analyzing the call stack 300, will initially verify the code located at the return address for that function. If, as a result of the verification, the code is not deemed malicious, then the analysis module 260 can sequentially verify the code copies at the function return addresses whose calls in the stack preceded the call for the F3 function.

Figure 4:
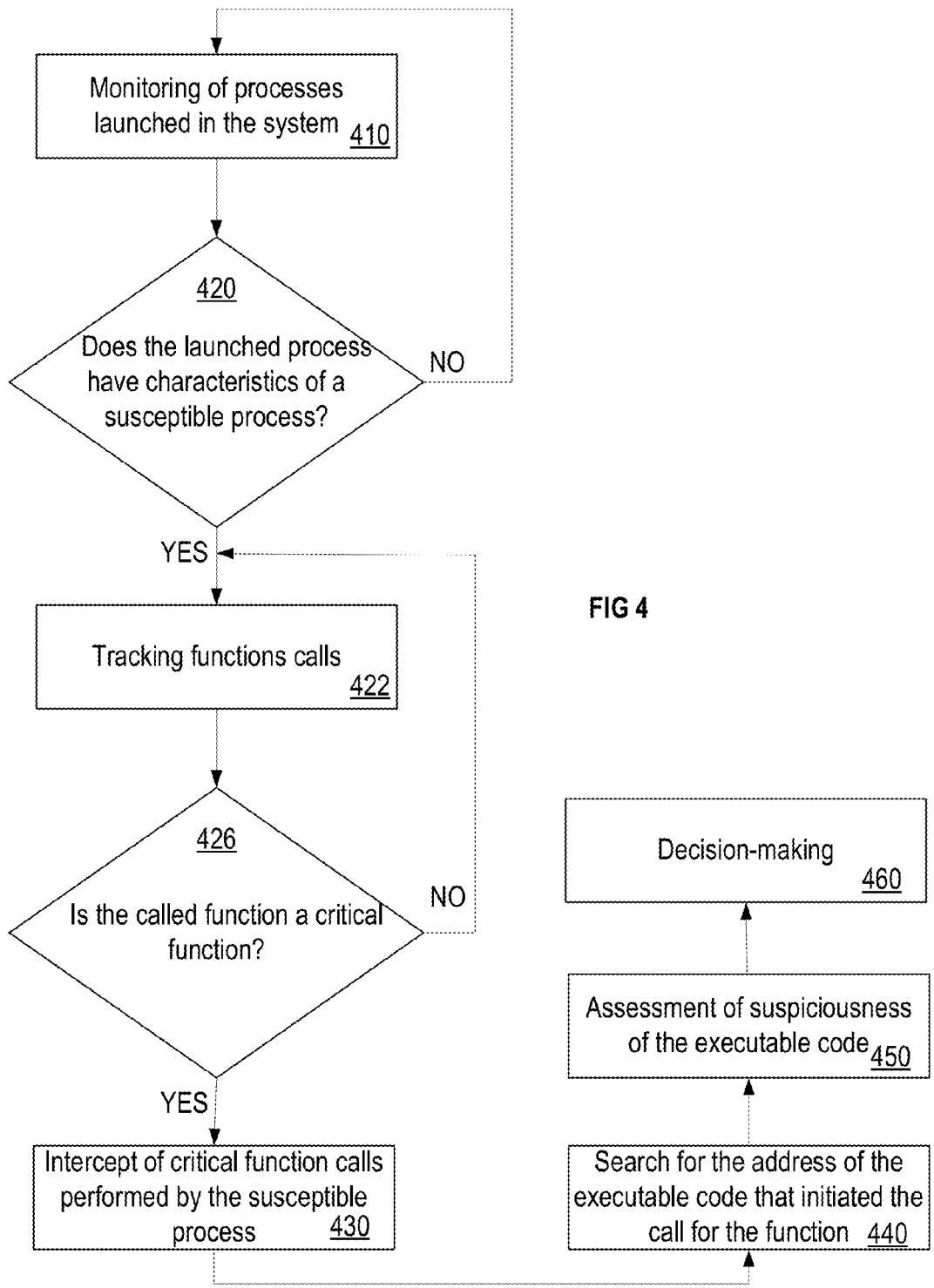
FIG. 4 is a flow diagram illustrating an exemplary machine-implemented method for assessing the maliciousness of a piece of code executed in the address space of a trusted process.

FIG. 4 shows the operation algorithm of a system for assessing the maliciousness of a piece of code executed in the address space of a trusted process. At Stage 410, the process monitor module 220 monitors the processes launched in the operating system. When the process is launched, at 420, the process selection module 225 determines whether the launched process has any characteristics of a susceptible process, information on such characteristics being stored in the process selection criteria database 230. If the launched process has any characteristics of a susceptible process, function call tracking module 240 tracks function calls made by the process at 422. For each called function, at 426, critical function call interception module 245 tests whether that called function is a critical function. In the affirmative case, at 430, critical function call interception module 245 intercepts the calls for critical functions among the calls for all functions performed by the process. The information on which of the functions called by the susceptible process should be considered as critical is stored in the critical functions database 250.

After the interception of a call for a critical function, the analysis module 260, at 440, analyzes the call stack in order to identify the executable code that initiated the call for the function. After that, the analysis module 260, at 450, assesses the maliciousness of the executable code based on the criteria information on which is stored in the database 270. Based on the results of the assessment at 460, the analysis module 260 makes a decision on the maliciousness of the executable code.

Figure 5:
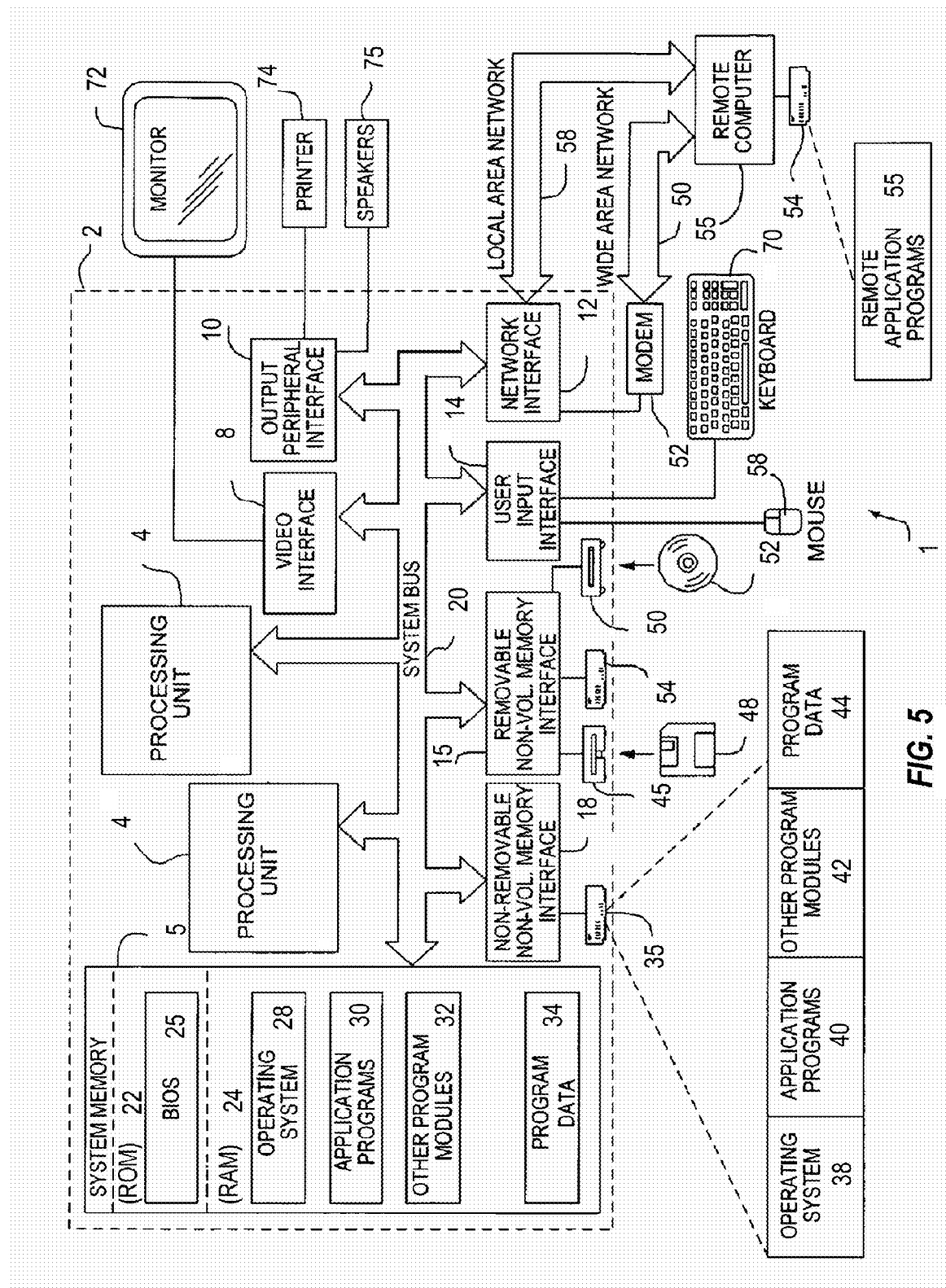
FIG. 5 is a block diagram illustrating an example of a general-purpose computer system that, when configured according to the architecture described herein according to various aspects of the invention, is made into a special-purpose apparatus with which aspects of the invention are carried out.

FIG. 5 is a diagram illustrating in greater detail a computer system 1 on which aspects of the invention as described herein may be implemented according to various embodiments. The computer system 1 may include a computing device such as a personal computer 2. The personal computer 2 includes one or more processing units 4, a system memory 6, a video interface 8, an output peripheral interface 10, a network interface 12, a user input interface 14, removable 16 and non-removable 18 memory interfaces and a system bus or high-speed communications channel 20 coupling the various components. In various embodiments, the processing units 4 may have multiple logical cores that are able to process information stored on computer readable media such as the system memory 6 or memory attached to the removable 16 and non-removable 18 memory interfaces 18. The computer 2 system memory 6 may include non-volatile memory such as Read Only Memory (ROM) 22 or volatile memory such as Random Access Memory (RAM) 24. The ROM 22 may include a basic input/output system (BIOS) 26 to help communicate with the other portion of the computer 2. The RAM 24 may store portions of various software applications such as the operating system 28, application programs 30 and other program modules 32. Further, the RAM 24 may store other information such as program or application data 34. In various embodiments, the RAM 24 stores information that requires low-latencies and efficient access, such as programs and data being manipulated or operated on. In various embodiments RAM 24 comprises Double Data Rate (DDR) memory, Error Correcting memory (ECC) or other memory technologies with varying latencies and configurations such as RAMBUS or DDR2 and DDR3. In this way, in various embodiments, the system memory 6 may store the input data store, access credential data store, operating memory data store, instruction set data store, analysis result data store and the operating memory data store. Further, in various embodiments, the processing units 4 may be configured to execute instructions that limit access to the aforementioned data stores by requiring access credential before access to the information is granted.

The removable 16 and non-removable 18 memory interfaces may couple the computer 2 to disk drives 36 such as SSD or rotational disk drives. These disk drives 36 may provide further storage for various software applications such as the operating system 38, application programs 40 and other program modules 42. Further, the disk drives 36 may store other information such as program or application data 44. In various embodiments, the disk drives 36 store information that doesn't require the same low-latencies as in other storage mediums. Further, the operating system 38, application program 40 data, program modules 42 and program or application data 44 may be the same information as that stored in the RAM 24 in various embodiments mentioned above or it may be different data potentially derivative of the RAM 24 stored data.

Further, the removable non-volatile memory interface 16 may couple the computer 2 to magnetic portable disk drives 46 that utilize magnetic media such as the floppy disk 48, Iomega® Zip or Jazz, or optical disk drives 50 that utilize optical media 52 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 2 may utilize the network interface 12 to communicate with one or more remote computers 56 over a local area network (LAN) 58 or a wide area network (WAN) 60. The network interface 12 may utilize a Network Interface Card (NIC) or other interface such as a modem 62 to enable communication. The modem 62 may enable communication over telephone lines, coaxial, fiber optic, powerline, or wirelessly. The remote computer 56 may contain a similar hardware and software configuration or may have a memory 64 that contains remote application programs 66 that may provide additional computer readable instructions to the computer 2. In various embodiments, the remote computer memory 64 can be utilized to store information such as identified file information that may be later downloaded to local system memory 6. Further, in various embodiments the remote computer 56 may be an application server, an administrative server, client computers, or a network appliance.

A user may enter information to the computer 2 using input devices connected to the user input interface 14 such as a mouse 68 and keyboard 70. Additionally, the input device may be a trackpad, fingerprint scanner, joystick, barcode scanner, media scanner or the like. The video interface 8 may provide visual information to a display such as a monitor 72. The video interface 8 may be an embedded interface or it may be a discrete interface. Further, the computer may utilize a plurality of video interfaces 8, network interfaces 12 and removable 16 and non-removable 18 interfaces in order to increase the flexibility in operation of the computer 2. Further, various embodiments utilize several monitors 72 and several video interfaces 8 to vary the performance and capabilities of the computer 2. Other computer interfaces may be included in computer 2 such as the output peripheral interface 10. This interface may be coupled to a printer 74 or speakers 76 or other peripherals to provide additional functionality to the computer 2.

Various alternative configurations and implementations of the computer are within the spirit of the invention. These variations may include, without limitation, additional interfaces coupled to the system bus 20 such as universal serial bus (USB), printer port, game port, PCI bus, PCI Express or integrations of the various components described above into chipset components such as the northbridge or southbridge. For example, in various embodiments, the processing unit 4 may include an embedded memory controller (not shown) to enable more efficient transfer of data from the system memory 6 than the system bus 20 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method for detection of malicious code injected into processes associated with known programs in a computing device comprising a plurality of computing resources including computing hardware and an operating system executing on the computing hardware, and a plurality of programs interfaced with the computing resources and executable as processes having one or more threads, the method comprising:
monitoring execution of processes on the computing hardware, each of the processes capable of executing program code;
selecting, from among the processes being monitored, a subset of processes consisting of only those processes which are susceptible processes, wherein the selecting is based on predefined process selection criteria that relates to a likelihood of malicious code being present;
for each of the susceptible processes of the subset of processes selected, tracking function calls made by threads of the process;
identifying, from among the tracked function calls, a subset of function calls consisting of only those function calls which are critical function calls, wherein the identifying of the critical function calls is based on critical function determination criteria that relates to a likelihood of malicious code being executed in an address space of a susceptible process by creation of a new thread or a new process in the address space of the susceptible process;
for each identified critical function call, identifying program instructions that caused the critical function call; and
assessing maliciousness of the program instructions based on predefined assessment criteria.

2. The method of claim 1, wherein the selecting of only those processes which are susceptible processes is based on process selection criteria that defines a susceptible process as a process associated with one or more specified applications that are known to be vulnerable to exploitation.

3. The method of claim 1, wherein the selecting of only those processes which are susceptible processes is based on process selection criteria that defines a susceptible process as a process associated with one or more applications that establish network connections.

4. The method of claim 1, wherein the selecting of only those processes which are susceptible processes is based on process selection criteria that defines a susceptible process as a process associated with one or more applications that creates child processes.

5. The method of claim 1, wherein the selecting of only those processes which are susceptible processes is based on process selection criteria that defines a susceptible process as a process associated with an application that exceeds a specified size.

6. The method of claim 1, wherein the selecting of only those processes which are susceptible processes is based on process selection criteria that defines a susceptible process as a process launched without a launch command by a user.

7. The method of claim 1, further comprising:
storing the process selection criteria in a process selection criteria data structure that is realized in a non-transitory storage medium that is part of the computing hardware.

8. The method of claim 1, wherein the identifying of only the critical function calls is based on critical function determination criteria that defines a critical function as a function that creates a new process.

9. The method of claim 1, wherein the identifying of only the critical function calls is based on critical function determination criteria that defines a critical function as a function that creates a new thread.

10. The method of claim 1, wherein the identifying of only the critical function calls is based on critical function determination criteria that defines a critical function as a function associated with one or more specified applications that ordinarily do not initiate file execution, and where the function call involves manipulation of an executable file.

11. The method of claim 1, further comprising:
in response to the identifying of each critical function call, preventing that function call from being carried out until at least completion of the assessing of the maliciousness of the program instructions that caused the function call.

12. The method of claim 1, wherein identifying program instructions that caused the critical function call includes identifying function call return addresses in a function call stack of the operating system.

13. The method of claim 1, wherein identifying program instructions that caused the critical function call includes identifying a first function call return address in a function call stack of the operating system and, in response to a determination that instructions at the first function call return address are non-malicious, identifying a second function call return address corresponding to a previous function.

14. The method of claim 1, wherein assessing maliciousness of the program instructions is based on assessment criteria that defines maliciousness in terms of circumstances of launching of a process.

15. The method of claim 1, wherein assessing maliciousness of the program instructions is based on assessment criteria that defines maliciousness based on a source from which an executable file is obtained.

16. The method of claim 1, wherein assessing maliciousness of the program instructions is based on assessment criteria that defines maliciousness based on whether the process containing the program instructions was launched by a user command.

17. The method of claim 1, wherein assessing maliciousness of the program instructions is based on assessment criteria that defines maliciousness based on a passage of time between a time when a file associated with a launched process was created, and a time of the launching of the process.

18. The method of claim 1, wherein assessing maliciousness of the program instructions includes applying at least one criterion selected from the group consisting of:
whether the program instructions are saved in a heap,
whether the program instructions contain instructions that determine their own address,
whether the program instructions contain indicia of a position-independent code,
whether the program instructions contain operation codes associated with performing data alignment,
whether the program instructions contain hashes generated from function names,
or any combination thereof.

19. A system for detection of malicious code injected into processes associated with known programs, the system comprising:
a computing device comprising a plurality of computing resources including computing hardware and an operating system executing on the computing hardware, and a plurality of programs interfaced with the computing resources and executable as processes having one or more threads;
a set of instructions executable by the computing hardware and stored in a non-transitory storage medium that, when executed, cause the computing hardware to implement:
a process monitor engine that detects active processes being executed on the computing hardware, each of the active processes capable of executing program code;
a process selection engine and a set of stored predefined process selection criteria, wherein the process selection engine selects, from among the processes being monitored by the process monitor engine, a subset of processes consisting of only those processes which are susceptible processes, the process selection engine selecting the susceptible processes based on the predefined process selection criteria that relates to a likelihood of malicious code being present;
a function call tracking engine that tracks function calls made by threads of each of the susceptible processes of the subset of processes selected by the process selection engine;
a critical function call interception engine and a set of stored critical function determination criteria, the critical function call interception engine identifies, from among the tracked function calls, a subset of function calls consisting of only those function calls which are critical function calls, wherein the critical function call interception engine identifies the critical function calls based on the critical function determination criteria that relates to a likelihood of malicious code being executed in an address space of a susceptible process by creation of a new thread or a new process in the address space of the susceptible process;
an analysis engine and a set of analysis criteria, wherein the analysis engine identifies, for each identified critical function call, program instructions that caused that critical function call, and assess maliciousness of the program instructions based on the set of analysis criteria.

20. The system of claim 19, wherein the process selection criteria defines a susceptible process as a process associated with one or more specified applications that are known to be vulnerable to exploitation.

21. The system of claim 19, wherein the process selection criteria defines a susceptible process as a process associated with one or more applications that establish network connections.

22. The system of claim 19, wherein the process selection criteria defines a susceptible process as a process associated with one or more applications that creates child processes.

23. The system of claim 19, wherein the process selection criteria defines a susceptible process as a process associated with an application that exceeds a specified size.

24. The system of claim 19, wherein the process selection criteria defines a susceptible process as a process launched without a launch command by a user.

25. The system of claim 19, wherein the process selection criteria is stored in a process selection criteria data structure that is realized in a non-transitory storage medium that is part of the computing hardware.

26. The system of claim 19, wherein the critical function determination criteria defines a critical function as a function that creates a new process.

27. The system of claim 19, wherein the critical function determination criteria defines a critical function as a function that creates a new thread.

28. The system of claim 19, wherein the critical function determination criteria defines a critical function as a function associated with one or more specified applications that ordinarily do not initiate file execution, and where the function call involves manipulation of an executable file.

29. The system of claim 19, wherein the critical function call interception engine is configured to identify function call return addresses in a function call stack of the operating system.

30. The system of claim 19, wherein the critical function call interception engine is configured to identify a first function call return address in a function call stack of the operating system and, in response to a determination that instructions at the first function call return address are non-malicious, identify a second function call return address corresponding to a previous function.

\* \* \* \* \*